(12) United States Patent
Weber et al.

(10) Patent No.: US 7,840,534 B2
(45) Date of Patent: Nov. 23, 2010

(54) INTEGRATION OF A DIGITAL ASSET MANAGEMENT SYSTEM WITH A NETWORK SALES SYSTEM

(75) Inventors: Jutta Weber, Mannheim (DE); Oliver Stanke, Saarbruecken (DE); Joachim Hartmann, St. Ingbert (DE)

(73) Assignee: SAP AG, Walldorf (DE)

( * ) Notice: Subject to any disclaimer, the term of this patent is extended or adjusted under 35 U.S.C. 154(b) by 723 days.

(21) Appl. No.: 11/261,783

(22) Filed: Oct. 31, 2005

(65) Prior Publication Data
US 2006/0179062 A1    Aug. 10, 2006

Related U.S. Application Data

(60) Provisional application No. 60/650,965, filed on Feb. 9, 2005.

(51) Int. Cl.
G06F 17/00 (2006.01)
G06F 7/00 (2006.01)

(52) U.S. Cl. .................. 707/611; 707/781; 707/797; 707/913; 707/948

(58) Field of Classification Search .................. None
See application file for complete search history.

(56) References Cited

U.S. PATENT DOCUMENTS

| | | | |
|---|---|---|---|
| 5,313,630 A | 5/1994 | Namioka et al. | |
| 5,729,744 A | 3/1998 | Gerken et al. | |
| 5,842,023 A | 11/1998 | Tsumura | |
| 6,018,741 A | 1/2000 | Howland et al. | |
| 6,405,215 B1 | 6/2002 | Yaung | |
| 6,519,571 B1 | 2/2003 | Guheen et al. | |
| 6,947,959 B1 * | 9/2005 | Gill ............................. | 715/202 |
| 7,039,655 B2 | 5/2006 | Kapczynski et al. | |
| 7,099,849 B1 | 8/2006 | Reeder et al. | |
| 7,146,325 B2 * | 12/2006 | Yamakawa et al. ............. | 705/1 |
| 7,149,734 B2 | 12/2006 | Carlson et al. | |
| 7,197,466 B1 * | 3/2007 | Peterson et al. ................. | 705/1 |
| 7,212,574 B2 | 5/2007 | Abrams et al. | |
| 7,213,005 B2 | 5/2007 | Mourad et al. | |
| 7,246,086 B2 * | 7/2007 | Araki et al. .................... | 705/26 |
| 7,249,057 B2 * | 7/2007 | Hatakama et al. ............. | 705/26 |
| 7,266,516 B2 * | 9/2007 | Song et al. ..................... | 705/27 |
| 7,266,704 B2 | 9/2007 | Levy | |
| 7,398,392 B2 | 7/2008 | Weber | |
| 7,587,428 B2 * | 9/2009 | Barabas et al. ............... | 707/201 |
| 2002/0019778 A1 * | 2/2002 | Isaacson et al. ............... | 705/26 |

(Continued)

OTHER PUBLICATIONS

Cardonet "Cardonet Rolls Out New Suite of Product Information Management Solutions", Press Release, Dec. 10, 2002.*

(Continued)

*Primary Examiner*—Luke S Wassum
(74) *Attorney, Agent, or Firm*—Kenyon & Kenyon LLP (57) ABSTRACT

The disclosure relates to integration of a digital asset management system with a network sales system. The digital asset management system may comprise digital asset storage, search and retrieval functionality. Each digital asset may comprise one or more versions of the asset, properties of the asset, and conditions on its use. By way of the integration with the network sales system, a digital asset or digital asset version may be assigned a product identity to facilitate sale of the digital asset or digital asset version.

19 Claims, 10 Drawing Sheets

U.S. PATENT DOCUMENTS

| | | | |
|---|---|---|---|
| 2002/0033844 A1 | 3/2002 | Levy et al. | |
| 2002/0042749 A1* | 4/2002 | Yugami et al. | 705/26 |
| 2002/0065735 A1* | 5/2002 | Hatakama et al. | 705/26 |
| 2002/0082997 A1* | 6/2002 | Kobata et al. | 705/51 |
| 2002/0103707 A1* | 8/2002 | Takeuchi et al. | 705/16 |
| 2002/0116217 A1* | 8/2002 | Yamakawa et al. | 705/1 |
| 2002/0143976 A1 | 10/2002 | Barker et al. | |
| 2002/0165832 A1* | 11/2002 | Kawaguchi | 705/400 |
| 2002/0186844 A1 | 12/2002 | Levy et al. | |
| 2002/0194081 A1* | 12/2002 | Perkowski | 705/26 |
| 2002/0198791 A1* | 12/2002 | Perkowski | 705/26 |
| 2003/0009392 A1* | 1/2003 | Perkowski | 705/26 |
| 2003/0051066 A1 | 3/2003 | Pace et al. | |
| 2003/0083962 A1* | 5/2003 | Araki et al. | 705/27 |
| 2003/0110126 A1 | 6/2003 | Dunkeld et al. | |
| 2003/0140034 A1 | 7/2003 | Probst et al. | |
| 2003/0208638 A1 | 11/2003 | Abrams et al. | |
| 2003/0213844 A1* | 11/2003 | Yoshida et al. | 235/383 |
| 2003/0233370 A1* | 12/2003 | Barabas et al. | 707/103 R |
| 2004/0015408 A1* | 1/2004 | Rauen et al. | 705/26 |
| 2004/0024652 A1 | 2/2004 | Buhse et al. | |
| 2004/0044730 A1* | 3/2004 | Gockel et al. | 709/203 |
| 2004/0088328 A1* | 5/2004 | Cook et al. | 707/104.1 |
| 2004/0112236 A1* | 6/2004 | Yokoyama et al. | 101/483 |
| 2004/0117377 A1* | 6/2004 | Moser et al. | 707/10 |
| 2004/0139001 A1* | 7/2004 | Henriques et al. | 705/39 |
| 2004/0176080 A1 | 9/2004 | Chakravorty et al. | |
| 2004/0181426 A1* | 9/2004 | Rose et al. | 705/1 |
| 2004/0181548 A1 | 9/2004 | Thomas et al. | |
| 2004/0187111 A1 | 9/2004 | Eakin | |
| 2004/0193508 A1* | 9/2004 | Takano et al. | 705/27 |
| 2004/0210468 A1* | 10/2004 | Rubel et al. | 705/8 |
| 2004/0210479 A1* | 10/2004 | Perkowski et al. | 705/14 |
| 2005/0004838 A1* | 1/2005 | Perkowski et al. | 705/14 |
| 2005/0010475 A1* | 1/2005 | Perkowski et al. | 705/14 |
| 2005/0028008 A1 | 2/2005 | Kumar | |
| 2005/0038707 A1* | 2/2005 | Roever et al. | 705/21 |
| 2005/0091270 A1 | 4/2005 | Beilinson et al. | |
| 2005/0096011 A1* | 5/2005 | Yoshida et al. | 455/408 |
| 2005/0155000 A1 | 7/2005 | Weiler et al. | |
| 2005/0197852 A1* | 9/2005 | Gebhard et al. | 705/1 |
| 2005/0246193 A1 | 11/2005 | Roever et al. | |
| 2005/0251456 A1* | 11/2005 | Perkowski | 705/26 |
| 2005/0262243 A1 | 11/2005 | Ternasky et al. | |
| 2006/0005237 A1 | 1/2006 | Kobata et al. | |
| 2006/0011716 A1* | 1/2006 | Perkowski | 235/375 |
| 2006/0046242 A1* | 3/2006 | Takano et al. | 434/365 |
| 2006/0161604 A1 | 7/2006 | Lobo et al. | |
| 2006/0179076 A1* | 8/2006 | Weber et al. | 707/102 |
| 2006/0253436 A1* | 11/2006 | Cook et al. | 707/3 |
| 2006/0265337 A1 | 11/2006 | Wesinger et al. | |
| 2007/0033154 A1 | 2/2007 | Trainum et al. | |
| 2007/0050409 A1* | 3/2007 | Bugir et al. | 707/104.1 |
| 2007/0073626 A1 | 3/2007 | Reeder et al. | |
| 2007/0113184 A1 | 5/2007 | Haot et al. | |
| 2007/0162416 A1* | 7/2007 | Morsch et al. | 707/1 |
| 2007/0208720 A1 | 9/2007 | Probst et al. | |
| 2007/0226068 A1* | 9/2007 | Keil et al. | 705/26 |
| 2007/0294173 A1 | 12/2007 | Levy et al. | |
| 2008/0133259 A1 | 6/2008 | O'Connor et al. | |
| 2008/0140433 A1 | 6/2008 | Levy et al. | |

OTHER PUBLICATIONS

Cardonet "Cardonet Product Master™ DE Distributor Edition", downloaded from cardonet.com, Jun. 9, 2003.*

Cardonet "A Complete Solution for Product Information Management & Data Synchronization", downloaded from cardonet.com, Oct. 8, 2003.*

Cardonet "Cardonet Expands Product Information Management Solution with Introduction of Cardonet Synergy™ Software", Press Release, May 25, 2004.*

Cardonet "Cardonet Synergy: The Optimal Combination of Power and Flexibility", downloaded from cardonet.com, Jun. 5, 2004.*

Rugullies, E. "Product Information Management Leaders Emerge", White Paper 34941, Forrester Research, Inc., Dec. 6, 2004.*

SAP AG "Master Data Management for the Media Industry", White Paper 50-087-438, Dec. 2007.*

Saqqara "Alcoa Shooses SAQQARA's Managed Service to Meet Cost Savings Objectives", Press Release, May 3, 2004.*

Saqqara "Item Master Management", downloaded from www.saqqara.com, Jan. 14, 2009.*

O'Leary, J. "UCCnet Synchronization: Managing the Integration Imperatives", Common.Connect, Jun. 2004, pp. 21-25.*

Parks, L. "Standardized Data on the Cheap: J.R. Wood Synchronizes Data Just Like the Big Guys", Stores, National Retail Federation, www.stores.org, Jul. 2004.*

"Microsoft Visual Sourcesafe Best Practices", Microsoft Corporation, created 311999 and updated 1212000, retrieved on Mar. 23, 2009 from http://msdn.microsoft.com/en-us/library/bb5O9342(VS.8O).aspx.

Artesia, Inc, TEAMS 4.4 website product information TEAMS 4.4 product information page, from http://www.artesia.com website as of Oct. 4, 2002 from Internet Wayback Machine http://web.archive.org/web/20021004111309/www.artesia.com/teams_44.html.

Meserve, Jason, "Artesia adds workflow to digital asset management tool", Sep. 10, 2002 Network Fusion (www.nwfusion.com) from Internet Wayback Machine http://web.archive.org/web/20030803003231/www.nwfusion.com/news/2002/0910art.html.

Kalin, Sari, "Putting Context in Context", Jul. 15, 2002 CIO Magazine (www.cio.com) from Internet Wayback Machine http://web.archive.org/web/20041205033454/www.cio.com/archive/071502/et_article.html.

Patz, Joel T, "Project 2000 gets your team working", PC World, Feb. 2000, vol. 18, iss 2, p. 18 retrieved from search in Pro Quest Direct.

Whitney, Daisy, "Discovery system aids repurposing" Electonic Media (www.emonline.com) Aug. 19, 2002, pub by Crain Communications from Internet Wayback Machine http://web.archive.org/web/20021003140451/www.emonline.com/technology/081902discovery.html.

Harkins, Susan Sales; Foust, Charlotte, "Preventing and recovering from database bloat", Inside Microsoft Access, Jul. 2003, vol. 11 ,Iss 7, p. 9 from Proquest document search http://proquest.umi.com/pqdweb?index=I0&did=355244011&SrchMode=1&sid=8&Fmt=6&VInst=PROD&VType=PQD&RQT=309&VName=PQD&TS=I188568334&clientId=19649.

Chris Ward, Time savers :[Final 1 Edition]. The Times, Aug. 23, 2003, p. 24. Retrieved from ProQuest Newsstand database.

* cited by examiner

Shopping Cart

All assets that you have previously selected for download will appear in this shopping cart. If you have completed your selection, You may choose to convert your files to a specific format, or download the assets in their original format.

Number of assets in your shopping cart: 2

Text 2          602     603     604                                    605

[Select Assets on page] [Deselect All] | [Convert Assets] | MimeType Filter [all extensions ▼]

☐  100-0003_IMG.JPG (100-0003_IMG.JPG)
   | MimeType: image/jpeg  [Convert]
   Name: 100-0003_IMG.JPG Doc Type: Animals Size(MB): 0.521 Created by: DAMADMIN Created: Tue Jul 13 15:26:18 CEST 2004 Doc. Status: Effective Sec. Status: Public
   Modified: Tue Jul 13 15:31:16 CEST 2004 Modified by: DAMADMIN Brand: COTTONELLE ☐  100-0026_IMG.JPG (100-0026_IMG.JPG)
   | MimeType: image/jpeg  [Convert]
   Name: 100-0026_IMG.JPG Doc Type: KC Backgrounds Size(MB): 0.403 Created by: FUHRMANN Created: Tue Mar 02 11:26:02 CET 2004 Doc. Status: Effective Sec. Status: Public
   Modified: Mon Sep 27 09:45:00 CEST 2004 Modified by: SCHLOSSERR region: LAO Brand: ANDREX;DEPEND;CR CLASSIC;BLOCK-IT Sector: Corporate

601

You also have a ways of getting your files. The standard download option will save items to your desktop. Other Download Options will allow you to save conversions and download within the next 48 hours, or use our Mass Transit system to download several large files to your desktop. CD/DVD allows you to make any conversions needed, and we will burn a CD and ship it to you. Please allow several days for a standard UPS delivery if you choose the CD/DVD option.

Download Shopping Cart

[Download] [Other Download Options] [Order CD/DVD]

INTEGRATION OF A DIGITAL ASSET MANAGEMENT SYSTEM WITH A NETWORK SALES SYSTEM

This application claims the benefit under 35 USC 119(e) of U.S. provisional application 60/650,965, filed Feb. 9, 2005 and fully incorporated herein by reference.

BACKGROUND OF THE INVENTION

A "digital asset" is a data object that carries marketable information content. Thus, the term covers various multimedia files, including image files, audio files (e.g., music), audio-video files and the like. The term also may cover text files or data files, such as product reports, analyses, recommendations, etc. Digital assets may be sold among various participants in a market. The assets typically are sold in contracts that limit ways in which a purchasing party may use the digital asset.

Digital asset management systems, as their name implies, are computer systems that permit asset owners to manage their assets. As another example, a digital asset management system may permit consumer product manufacturers (who manufacture an array of products) to manage their retailers' or advertisers' use of product images throughout advertisements and other commercial notices regarding the products themselves.

In known digital asset management systems, consumers' user experiences in browsing through and retrieving digital assets is awkward and non-intuitive. Therefore, there is a need in the art for a digital asset management system that is easy to use.

Moreover, as noted earlier, digital assets may be marketed and sold. The effectiveness of communication networks such as the Internet as a marketing venue for various products and services has been recognized. In view of this, it would be advantageous to integrate a digital asset management system with a network sales system.

BRIEF DESCRIPTION OF THE DRAWINGS

FIGS. 3-6 show examples of screen displays of the digital asset management system;

DETAILED DESCRIPTION

Embodiments of the present invention comprise a digital asset storage, search and retrieval system. The system may access stored digital assets using a hierarchical classification system, providing for efficiency in search and retrieval. Conditions on the use of each digital asset may be included with each asset, providing needed controls. Further, a number of advantageous user-friendly features provide for ease of use.

Embodiments of the present invention further relate to an automated system and method for integrating the digital asset management system with a network sales system. The network may be the Internet. The network sales system may provide a product identity to a digital asset of the digital asset management system to facilitate sale of the digital asset.

The discussion begins with a description of a digital asset management system according to embodiments of the invention, and then moves to a description of integration of the digital asset management system with a network sales system according to embodiments of the invention.

Digital Asset Management System

The digital asset management system described herein may include objects and use object-oriented methods. As is known, a software object may include data and an interface through which other objects can read, change or add to the data. Linkages may be formed between objects. Though it is typically transparent to the object-oriented programmer, in embodiments objects may be implemented at least in part as tables comprising a plurality of modifiable entries that collectively exhibit the behavior that characterizes an object and that can logically link objects. For example, digital assets or digital asset versions of the digital asset management system may be objects that may be linked with other objects, such as business objects representing products.

Figure 1:
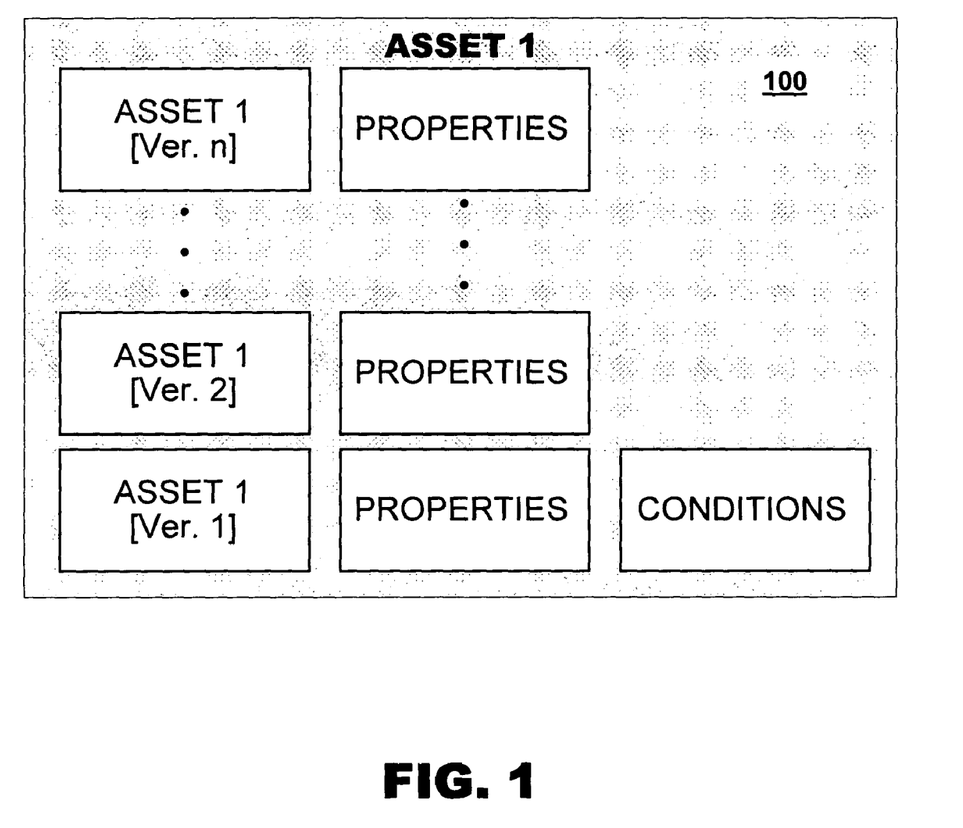
FIG. 1 shows a data structure for a digital asset according to embodiments of the present invention.

FIG. 1 shows a data structure for a digital asset 100 according to embodiments of the invention. A digital asset 100 may include multiple parts. The parts may include files of all kinds. The files may include, for example, one or more media objects, such as a picture, movie, song, data or the like. The digital asset may contain multiple versions of the files, including a latest or active version, and all previous versions.

The digital asset 100 may further include properties. The properties may be used to classify the digital asset. The properties may apply to specific versions and be different for different versions. For example, the properties may identify which of the versions of a digital asset is the effective version. Properties may also apply to the digital asset 100 as a whole and not to a specific version.

A digital asset and its versions may be viewed as a "logical information object" (LOIO) and "physical information objects" (PHIOs), respectively. A digital asset as a LOIO may be thought of as representing a general concept or category—say, "Advertisement for a diaper." A succession of versions of the digital asset represent various actual realizations of a diaper advertisement, or PHIOs. It should be understood that, as used herein, "digital asset," unless distinguished from a version, generally means a version of a digital asset, i.e., a PHIO.

As noted, the properties may identify which of possibly many versions is active (i.e., valid or currently in effect). Only one version can be active at a time. When a new version is added to the digital asset, it need not be identified as active. For example, it can be a work in progress not yet ready for release to other parties. When a new version is identified as active, however, a formerly active version will be designated not active. A digital asset management system may review these activeness designations within a properties field to determine which media object to release to external parties.

The digital asset 100 may further include conditions on its use. The conditions may include legal rights to and/or restrictions on use of the digital asset. The digital asset may have attributes indicating whether a condition is assigned, and whether the condition is currently valid. When an operation such as viewing or download is attempted, access control may be performed to check these attributes and determine whether the operation is valid.

The conditions may be specified, for example, as a text field, to be reviewed manually by external parties to ensure compliance with the conditions. For example, the conditions may identify a date range for which the external party is entitled to use the digital asset. The conditions could also be in the form of separate documents or files, such as .pdf or .doc files. Conditions may be inherited—propagated among related digital assets. This ensures data integrity and ensures that valid conditions are assigned to all affected digital assets.

Figure 2:
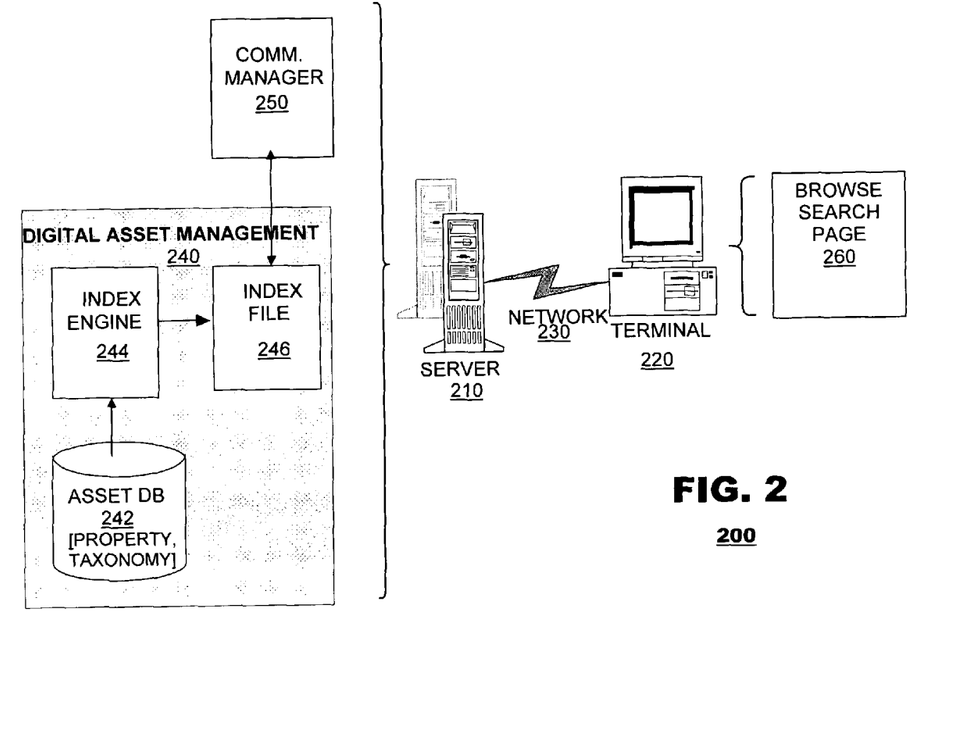
FIG. 2 shows a digital asset management system according to embodiments of the present invention.

FIG. 2 illustrates a system 200 according to embodiments of the invention. The system 200 may comprise a server 210 and a terminal 220, connectable to the server 210 by a communication network 230. The network may include, for example, the Internet or World Wide Web, but could also include any wide area network (WAN) or local area network (LAN). The server 210 may include a processor and a memory coupled to the processor. The server 210 may further include storage media storing computer-executable instructions to implement a digital asset management application 240 and a communication manager 250. The server 210 may execute the digital asset management application 240 and the communication manager 250. The communication manager 250 may manage communication with the terminal 220. In particular, the communication manager may send web pages, such as a browse search page 260, interactively generated by the digital asset management application 240, via the network 230 to a client at the terminal 220.

The digital asset management application 240 may further comprise a database 242 storing digital assets. An index engine 244 of the digital asset management application 240 may access digital assets in the database 242 to form an index file 246. The index file 246 may be used, among other things, for responding to user requests by generating web pages for sending to the user. Specifically, the digital asset management application 240 may receive user requests entered by a user at a terminal 220, and execute the index engine 244 to access the asset database 242 to respond to the requests. The requests may be, in particular, search parameters entered in a browse session in order to locate a desired digital asset. Based on the search parameters entered, the user may be caused to navigate through a series of displays.

Tree structures associated with the digital assets may determine a navigation path through the displays. As is well known, a tree structure in software terms may define a hierarchy of nodes, including "root" or "parent" nodes and various levels of "child" nodes. In embodiments of the present invention, the tree structures or hierarchies may be used to implement a taxonomy or classification system under which assets are organized and classified based on their properties. The hierarchies may be built, for example, by a system administrator or other system operator who uses a GUI (graphical user interface) to define classes and related subclasses. A given asset, depending on its properties, could belong to more than one hierarchy.

Figure 3:
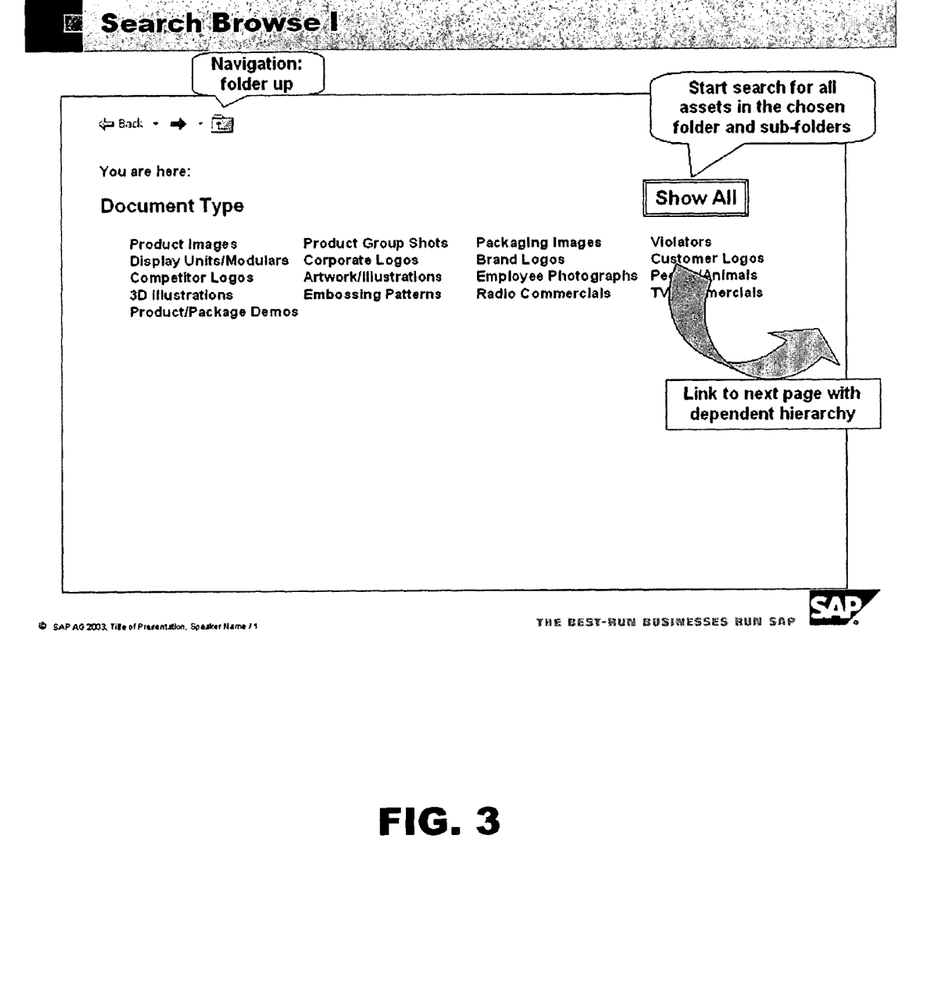

An example follows. The above-described components provide a number of capabilities and user-friendly features. Among these is a browse search capability. Browse search functionality according to embodiments of the present invention may use the hierarchical tree structures and their classifications to efficiently perform a search and present its results. FIG. 3 shows an example of a screen display that could be presented to a user, based on search parameters entered by the user. For example, a user might indicate that he wants to search for a digital asset. Possibly after one or more preceding displays (such as a log-on screen), the display of FIG. 3 may be presented to the user. The display shows a list of asset (document) types. Each list item (e.g., "Product Images" or "Customer logos") represents a root node in a hierarchical tree structure.

Figure 4:
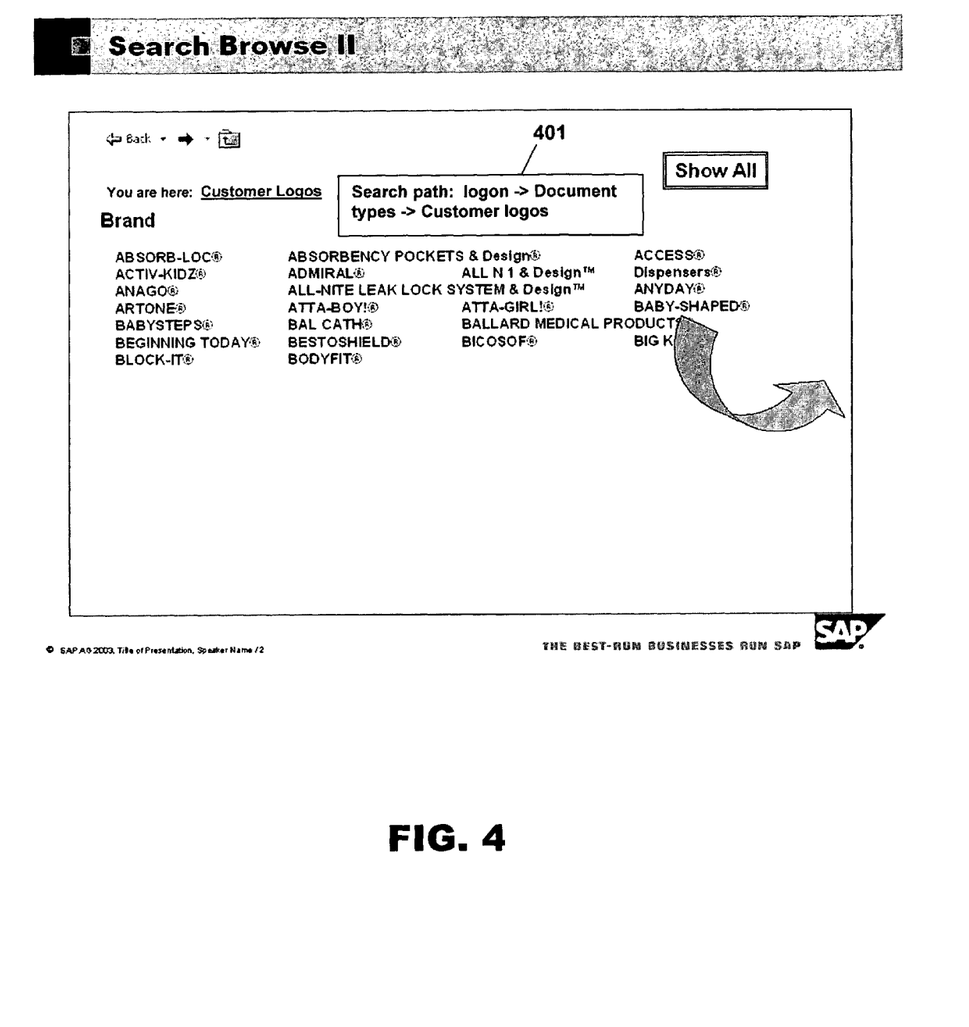

Each root node in the hierarchy may have child nodes representing a further refinement of the classification assigned to the root node. By selecting a node (e.g. by "clicking" on the corresponding field or otherwise querying or activating a node), a user may see a display of the next-lower level in the hierarchy. FIG. 4, for example, shows a display that a user might see by selecting the "Customer Logos" field and clicking on "Show All". A list of specific customer logos is presented. Again, each specific customer logo may represent a node, classified according to a taxonomy, in a hierarchy. A user may be able to navigate upward or downward (or, backward or forward from another perspective) in the hierarchy. Moreover, a display could show more than one level of a hierarchy. For example, a display could show both child nodes and grandchild nodes of a higher-level node.

In an advantageous feature according to embodiments of the invention, a search or navigation path report 401, which indicates the path taken through a given hierarchy up to the current screen display, may be provided. The example of FIG. 4 is rather simple but it is illustrative. In actual practice navigation paths could be considerably more complex. This feature provides for a more convenient user experience because it can help the user recall how to reach a desired asset in the future, or assist the user in searching for similar assets.

When the browser is invoked, the digital asset management application 240 may determine which nodes of the hierarchy point to stored assets. "Empty" nodes, i.e., nodes to which some classification is assigned but which do not currently point to actual stored assets are not displayed. Also, nodes which contain only assets the user is not authorized to see are not displayed.

Figure 5:
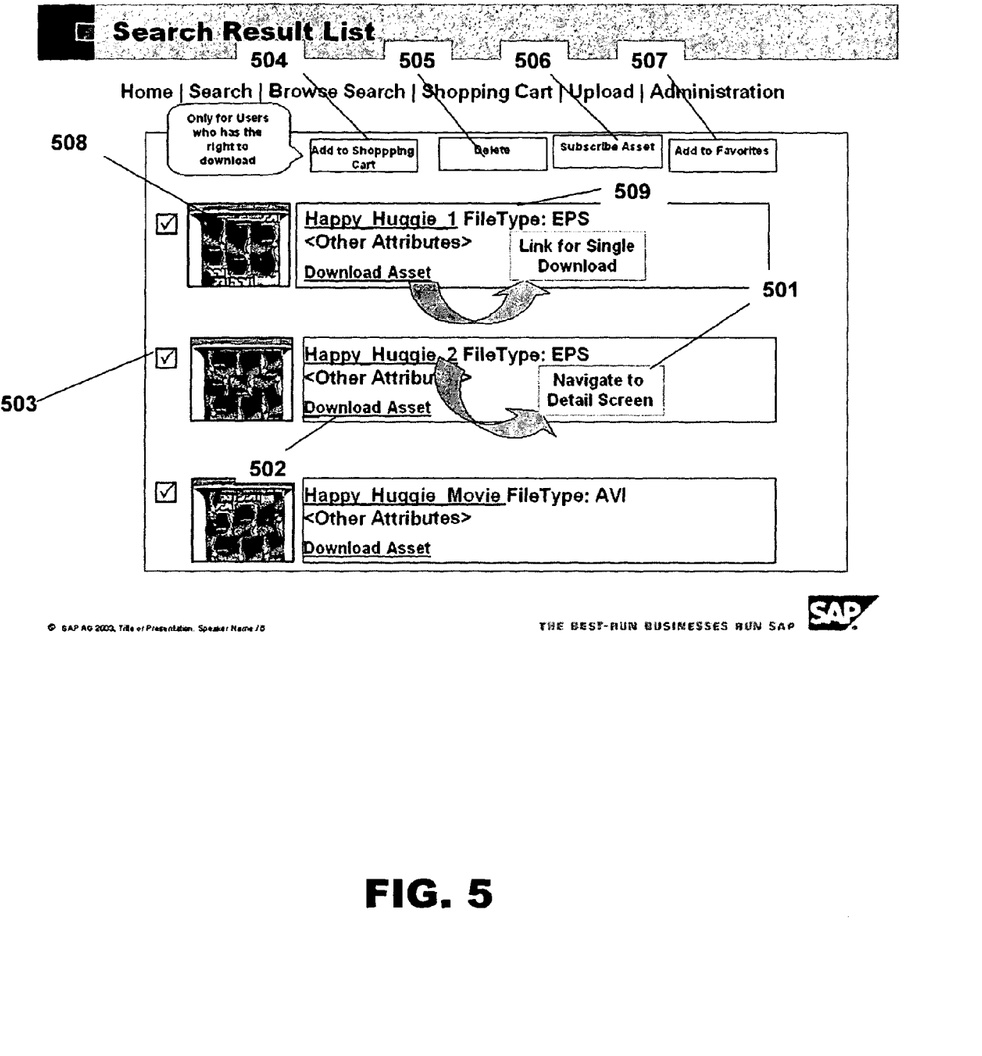

By selecting an item, say, "BABY-SHAPED®", in the list of customer logos, a user may see the next-lower level in the hierarchy, as shown in FIG. 5. In this example, FIG. 5 represents a "results list" where nodes in the hierarchy correspond directly to stored digital assets.

As noted earlier, the same digital asset may belong to multiple different hierarchies, depending upon whether its properties fit to a given set of classifications of a hierarchy. However, the path to the digital asset may be different for each hierarchy. For example, one or more of the digital assets shown in FIG. 5 might have also been reached if the user had selected "Product Images" instead of "Customer Logos" as the root node. However, the path may have included a different series of nodes and corresponding displays, because of the way the nodes of the "Product Images" hierarchy were classified when this hierarchy was built. Thus, according to embodiments of the present invention, among other properties of a digital asset there may be a plurality of "path" properties. Each path property may identify all the levels of a given hierarchy that must be navigated in order to reach a results list.

Returning now to FIG. 5, a number of operations may be possible with a results list. For example, a user may be able to navigate to a detail view of a listed asset by clicking on a field such as box 501, download an asset on the list by clicking a field such as box 502, mark assets via a checkbox 503, add an asset or assets to a "shopping cart" (box 504), delete an asset (box 505), subscribe to an asset (box 506) (a subscriber may receive notification, via email e.g., when an asset changes) or add an asset to a "favorites" list (box 507). An asset may include a thumbnail picture 508 and a property, such as a file type 509.

FIG. 6 shows an example of a shopping cart. A shopping cart in this context is a data container for selected assets. Shopping cart entries may include an asset report 601 that comprises such information about an asset as a file name and type, a creator of the asset and a create time, a version status (e.g. latest or active), a security status (e.g., access to the asset is public), a last-modified time, an identifier of the modifier, and the like.

Options further provided from the shopping cart may include selecting or de-selecting assets (boxes 602 and 603), converting an asset to a different file type (box 604), removing an asset from the shopping cart (box 605), and downloading selected assets (box 606). When an asset is downloaded, the asset report 601 may be downloaded along with the asset. The asset report 601 may further include hyperlinks (not shown) to downloaded assets. Additionally, the asset report is fully customizable via XSLT Style Sheets.

The above-described system may provide for mass upload/download of assets, or for upload/download of a single asset.

In another feature, a user can opt to assign a new filename to an exported asset. In typical scenarios, the user would select a product name or a document type as the new filename.

Integration of Digital Asset Management System with Network Sales System

According to embodiments of the present invention, the digital asset management system described above may be integrated with a network sales system. The integration may be useful, for example, because while the digital asset management system provides an efficient storage and retrieval mechanism, it is not necessarily adapted to selling the digital assets. Selling involves mechanisms such as product identification, pricing, billing and so on. Though not necessarily part of a digital asset management system, such mechanisms may already exist in a network sales system. Consequently, these are available for linking to a digital asset, to facilitate the selling of the digital asset.

Accordingly, embodiments of the present invention relate to the integration of a digital asset management system with a network sales system. As part of this integration, a digital asset may be linked with a product master in a network sales system. The product master may thereafter represent the digital asset for purposes of providing processes and functionality for selling the digital asset. For example, the product master may be assigned specification information, sales conditions and a price by way of the network sales system, and these can be used for sale of the digital asset. The sales conditions may relate to "who sells how," i.e., whether sales are by a distribution chain or other sales organization, pricing, whether there is a discount involved, and the like.

Figure 7:
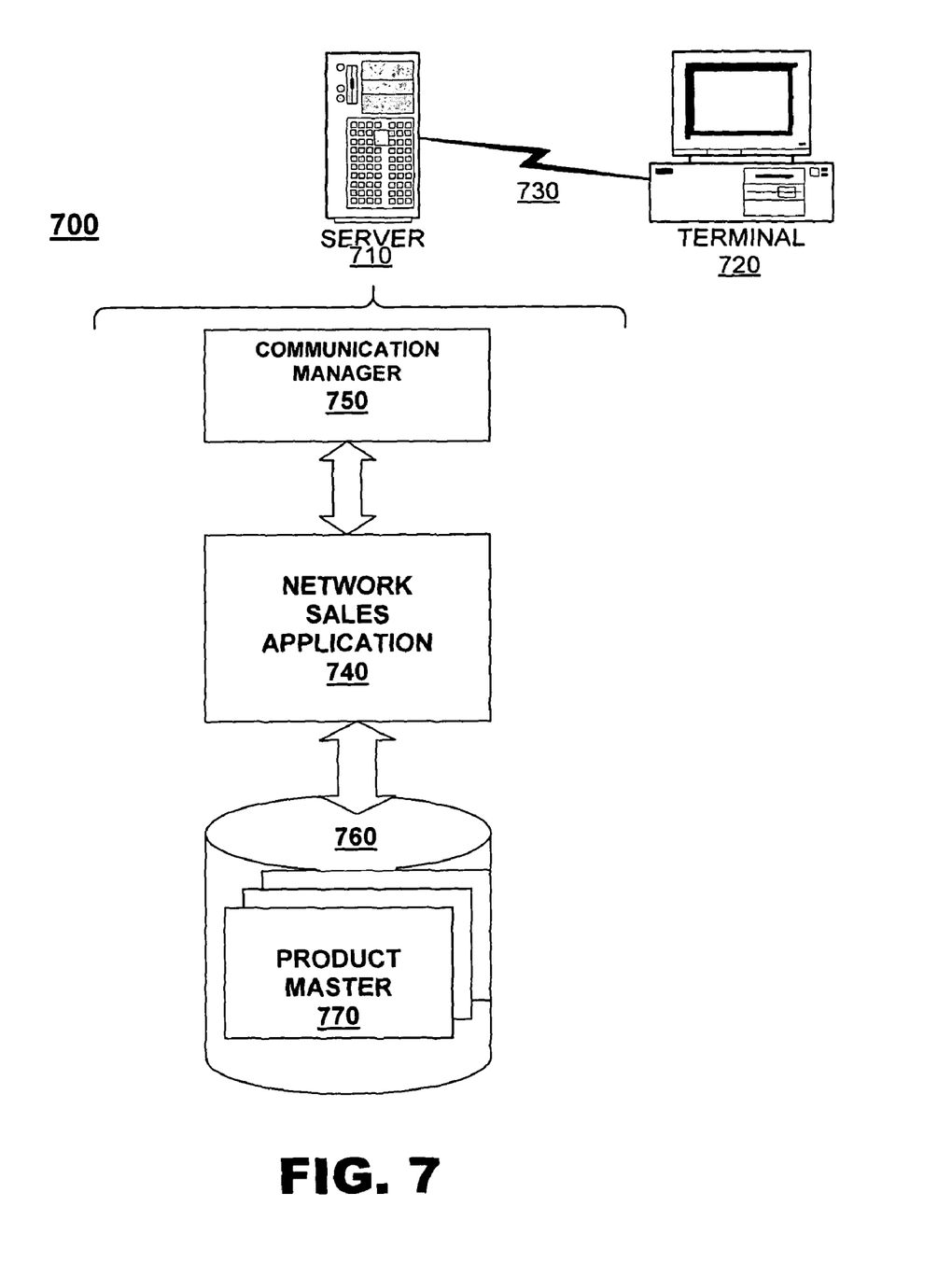
FIG. 7 shows a network sales system according to embodiments of the present invention.

FIG. 7 shows a network sales system 700. The network sales system 700 may be deployed on one or more servers 710 and terminal(s) 720, connectable to the server 710 by a communication network 730. The network may include or be part of, for example, the Internet or World Wide Web, but could also include or be part of any wide area network (WAN) or local area network (LAN). The server 710 may include a processor and a memory coupled to the processor. The server 710 may further include storage media storing computer-executable instructions to implement a network sales application 740 and a communication manager 750. The server 710 may execute the network sales application 740 and communications manager 750. The system 700 may further comprise a database 760. The database 760 may include a product master file 770.

The communication manager 750 may manage communication with the terminal 720. In embodiments, the communications management applications may comprise web services and/or process agents. In particular, the communication manager 750 may interact with a client at the terminal 720 by exchange of web pages via the network 730. The web pages may be generated by the network sales application 740. Using the terminal 720, the client may order products identified in the product master file 770.

Figure 8:
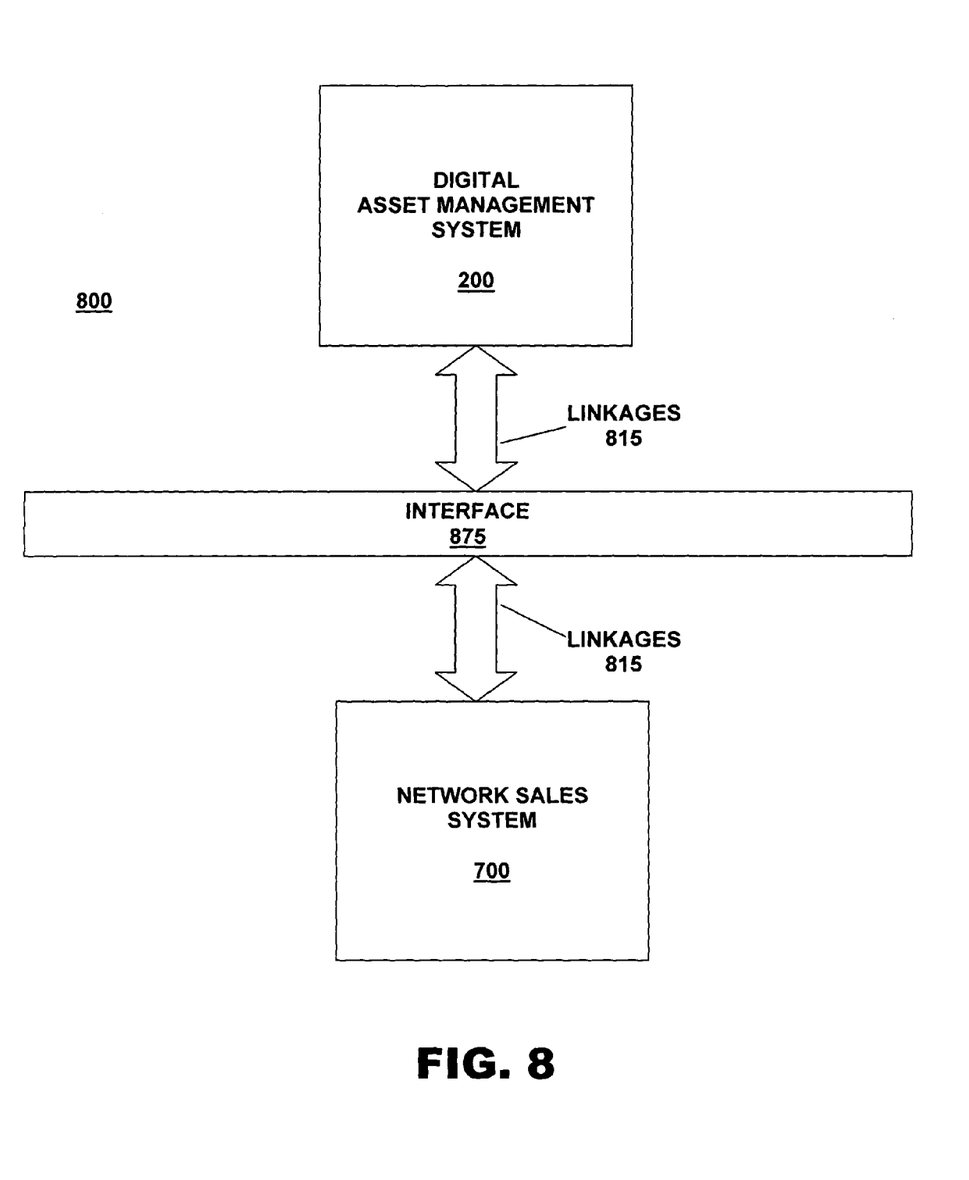
FIG. 8 shows a integrated digital asset management system and network sales system according to embodiments of the present invention.

FIG. 8 illustrates an integrated system 800 according to embodiments of the present invention. In the integrated system 800, a digital asset management system 200 according to embodiments of the present invention may be linked with the Network sales system 700 via an interface 875.

As described above, both the digital asset management system 200 and the network sales system 700 may be network-based. Thus, the interface 875 may comprise the physical interconnections and media, such as routers, switches, cables, wireless transmission and reception equipment, and the like, for electronically propagating information in a network. The interface 875 may further include higher-level control logic and computers, such as APIs (application program interfaces), connectivity protocols like TCP/IP and various client/server applications and their associated hardware platforms. Linkages 815 between the respective systems and the interface may represent physical connections or logical (e.g., software-implemented) connections/relationships It is noted that the digital asset management application 240, the network sales application 740 and the communication managers 250 and 750 need not execute on physically distinct hardware platforms. For example, server 210 and server 710 could be the same server which may act as a "portal" to all of the applications.

The integrated digital asset management/network sales system 800 may be used to sell digital assets over the network. To this end, according to embodiments of the invention, when a new digital asset or digital asset version is created on (e.g., uploaded to) the digital asset management system, it may be classified as sellable or not sellable. The classifying operation could be performed by a human operator, for example a marketing assistant, using a user interface. If a digital asset or digital asset version is classified as sellable, a corresponding product master (e.g., product master object) may be automatically created on the network sales system. The "sellable" classification may be one of the digital asset's or asset version's properties. The newly created product master may be stored, for example, in the product master file 770.

Figure 9:
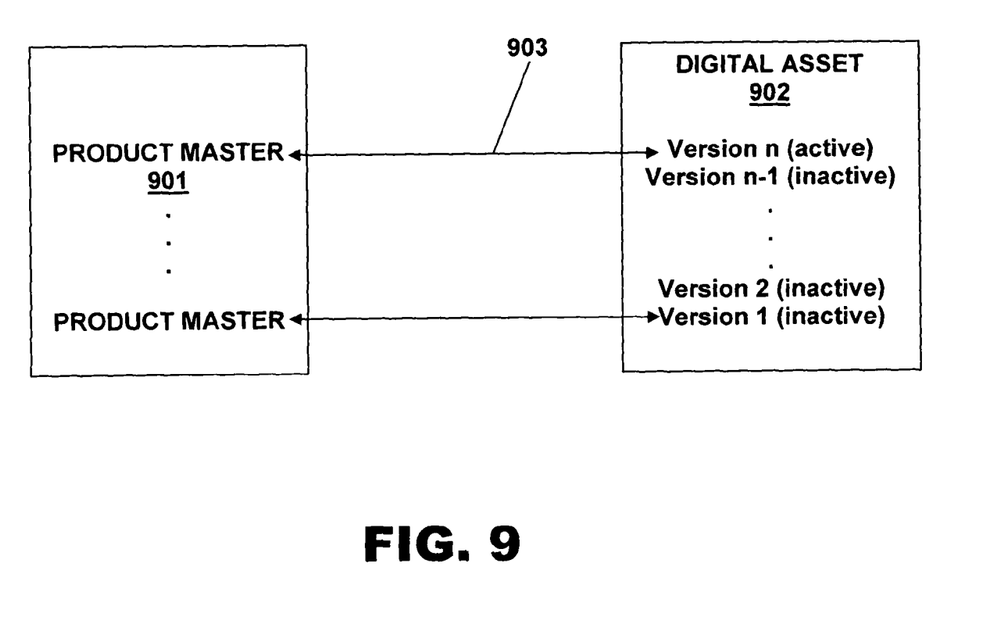
FIG. 9 shows a linkage between a digital asset version and a product master according to embodiments of the present invention.

A linkage may be automatically formed between the digital asset/asset version and the product master. This is illustrated in FIG. 9. FIG. 9 shows a product master 901, a digital asset 902, and linkage 903 between the product master and each version of the digital asset. By way of the linkage, information relating to the digital asset versions may be automatically propagated to the corresponding product master. For example, a title and description of the digital asset/asset version may be automatically propagated to the corresponding product master. The linkage 903 could be implemented, for example, by way of an entry or entries in a table in a memory or database defining a relationship between objects. The linkage may further be visually represented in respective user interfaces of the digital asset management system and the network sales system. For example, each user interface may represent the linkage graphically as a "tab" or other display field. By clicking on the field in either the digital asset management system or the network sales system, a user may display information about or perform other operations on the associated digital asset or product master.

Now that there is a product master corresponding to the digital asset, the digital asset can be sold. An administrative operator (e.g. a sales assistant) may now, for example, via either the digital asset management system or the network sales system, assign a price, sales conditions, product specification or other data relevant to a sale, to the product master, and consequently to the digital asset/asset version as well. Underlying functionality in the network sales system will process this information and thereafter present it to a network shopper, and handle a sale if the shopper decides to buy the digital asset.

It may be the case that properties need to be changed for a digital asset. If so, these changes may be applied on the digital asset management system, and they may be automatically propagated to the corresponding product master on the network sales system. Further, the network sales system could include functionality whereby the product master could be modified to change, for example, pricing, product specification or other sale information.

The sellable/non-sellable decision could be overridden manually. Thus, it may happen that a previously existing digital asset or asset version that was previously classified as not sellable may have its properties changed to indicate that it is now sellable. In this event, the automatic processes described above may be performed. That is, a product master corresponding to the digital asset or asset version may be created on the network sales system and linked to the digital asset or asset version. Price, conditions and other sales data may then be assigned to the product master.

On the other hand, a digital asset or asset version that was previously classified as sellable may be re-classified as not sellable. In this event, the network sales system may be automatically updated so as to no longer present or administer the digital asset or asset version as a sellable product.

Figure 10:
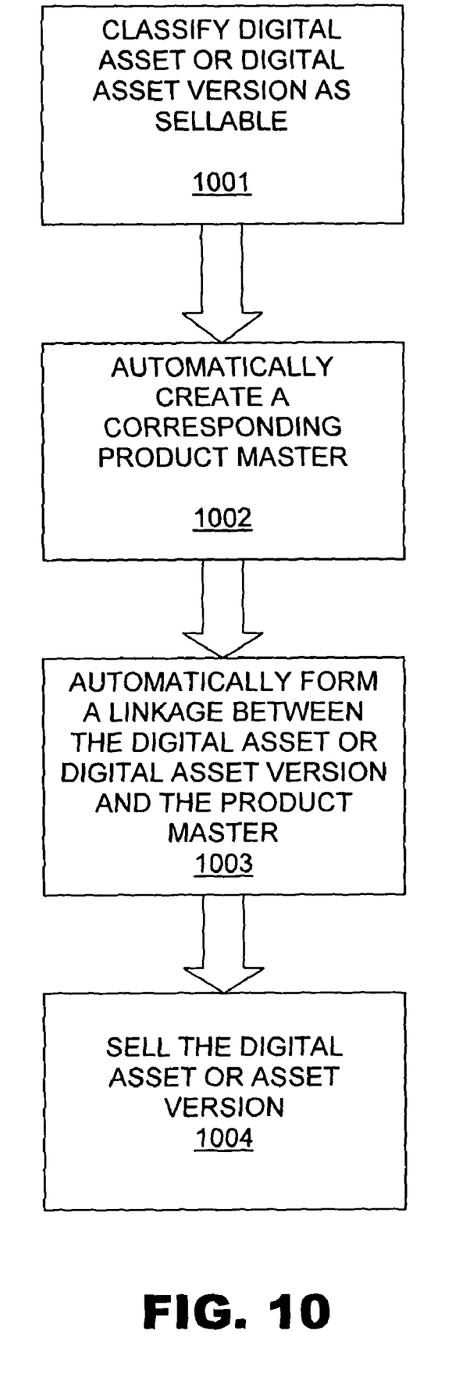
FIG. 10 shows a method according to embodiments of the present invention.

FIG. 10 shows a process according to embodiments of the present invention. As shown in block 1001, on a digital asset management system, a digital asset or digital asset version may be classified as sellable. The digital asset or digital asset version may be new or pre-existing.

Then, as shown in block 1002, on a network sales system, based on the classification, a product master corresponding to the digital asset or digital asset version may be created. The product master may be automatically linked to the digital asset or digital asset version on the digital asset management system, as shown in block 1003. Sales information, such as price, conditions and product specification may be assigned to the product master, as shown in block 1004. The digital asset or digital asset version may then be sold via the network sales system.

As noted earlier, embodiments of the present invention may comprise computer-executable instructions. The computer-executable instructions may be stored and transported on machine-readable media such as magnetic tape, floppy disk or CD-ROM. The computer instructions may be retrieved from the machine-readable media using a suitable reading device into a memory and executed by a processor. The computer-executable instructions may be distributed across a plurality of media, such as on physically separate storage devices respectively associated with physically separate computer systems that may communicate via a network. The functionality disclosed hereinabove for performing the embodiments may find specific implementations in a variety of forms, which are considered to be within the abilities of a programmer of ordinary skill in the art after having reviewed the specification.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A system comprising:
   a processor; and
   computer-executable instructions for execution by the processor, the instructions to implement:
   a digital asset management application as part of a digital asset management system to manage digital assets structured in a hierarchy of nodes with each digital asset including a plurality of embedded versions of actual realizations of the digital asset organized in the nodes according to an asset type, with at least one digital asset appearing under a plurality of asset type nodes in the hierarchy and each version including a property identifying whether the version is active and a legal condition specifying a distribution restriction of the version,
   a network sales application as part of a network sales system, the network sales application to administer a database of sales related information including sales conditions specifying a price and a medium for distributing an active version of each digital asset to a user,
   an user interface application to identify active versions of digital assets organized under a node matching a user-selected criterion and compare an user-selected sales condition from the sales conditions of the identified active versions to the corresponding legal condition and commence a sale of the user-selected digital asset through the network sales application when the comparison indicates the distribution medium in the user-selected sales condition satisfies the distribution restriction in the corresponding legal condition, and
   a bidirectional linkage between the digital asset management application and the network sales application.

2. The system of claim 1, wherein the linkage is between a digital asset on the digital asset management system and a product master on the network sales system.

3. The system of claim 2, wherein sales information is assignable to the product master.

4. The system of claim 2, wherein the digital asset is sellable over the network.

5. The system of claim 1, wherein the actual realization of each digital asset includes a media object.

6. The system of claim 5, wherein the media object is a multimedia file embedded in the respective digital asset.

7. The system of claim 5, wherein each version of a digital asset reflects an update to the media object representing the digital asset.

8. The system of claim 1, wherein the corresponding legal condition is transmitted as a separate document to the user selecting the digital asset during the commencement of the sale.

9. The system of claim 8, wherein the corresponding legal condition is embedded as text in the separate document.

10. A computer-implemented method comprising:
    classifying a version of a plurality of digital assets structured in a hierarchy in a digital asset management application on a digital asset management system as sellable with each digital asset including a plurality of embedded versions of actual realizations of the digital asset organized in nodes according to an asset type, with at least one digital asset appearing under a plurality of asset type nodes in the hierarchy, the digital asset management system containing a plurality of legal conditions specifying a distribution restriction on different versions of the digital assets;

based on the classification, automatically creating a corresponding product master in a network sales application on a network sales system for each sellable version, the corresponding product master containing a plurality of sales conditions, each sales condition specifying a price and a medium for distributing the sellable version of each digital asset to a user;

identifying the sellable versions of digital assets organized under a node matching a user-selected criterion;

commencing a sale of the sellable version of a user-selected digital asset from the identified sellable versions of digital assets when a comparison of a user-selected sales condition of the user-selected sellable version to a corresponding legal condition of the user-selected sellable version indicates the distribution medium in the user-selected sales condition satisfies the distribution restriction in the corresponding legal condition; and automatically forming a bidirectional link through a processor between the digital asset management system and the network sales system.

11. The method of claim 10, further comprising automatically propagating information relating to the digital asset to the product master via the link.

12. The method of claim 10, further comprising assigning sales information to the product master.

13. The method of claim 10, further comprising selling the digital asset on the network sales application.

14. The method of claim 10, further comprising reclassifying the digital asset as not sellable, and based on the reclassification, causing the corresponding product to no longer be available for sale on the network sales application.

15. A machine-readable medium storing computer-executable instructions to perform a method comprising:

classifying a version of a plurality of digital assets structured in a hierarchy in a digital asset management system as sellable with each digital asset including a plurality of embedded versions of actual realizations of the digital asset organized in nodes according to an asset type, with at least one digital asset appearing under a plurality of asset type nodes in the hierarchy, the digital asset management system containing a plurality of legal conditions specifying a distribution restriction on different versions of the digital assets;

based on the classification, automatically creating a corresponding product master in a network sales application through a processor for each sellable version, the corresponding product master containing a plurality of sales conditions, each sales condition specifying a price and a medium for distributing the sellable version of each digital asset to a user;

identifying the sellable versions of digital assets organized under a node matching a user-selected criterion;

commencing a sale of the sellable version of a user-selected digital asset from the identified sellable versions of digital assets when a comparison of a user-selected sales condition of the user-selected sellable version to a corresponding legal condition of the user-selected sellable version indicates the distribution medium in the user-selected sales condition satisfies the distribution restriction in the legal condition; and automatically forming a bidirectional link between the digital asset management system and the network sales application.

16. The machine-readable medium of claim 15, wherein only one version of an asset may be classified as sellable at a time.

17. The machine-readable medium of claim 15, wherein the distribution restriction in the corresponding legal condition prevents certain users from downloading the sellable version of the digital asset.

18. The machine-readable medium of claim 15, wherein the distribution restriction in the corresponding legal condition prevents certain users from viewing the sellable version of the digital asset.

19. The machine-readable medium of claim 15, wherein access control is used to enforce the corresponding legal condition.

* * * * *